(12) United States Patent  (10) Patent No.: US 9,240,149 B2
Kim et al.  (45) Date of Patent: Jan. 19, 2016

(54) LIQUID CRYSTAL DISPLAY DEVICE AND METHOD OF FABRICATING THE SAME

(71) Applicant: LG Display Co., Ltd., Seoul (KR)

(72) Inventors: HongSoo Kim, Daegu (KR); KyeongHwa Beom, Jeollabuk-Do (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 13/858,822

(22) Filed: Apr. 8, 2013

(65) Prior Publication Data

US 2013/0293595 A1  Nov. 7, 2013

(30) Foreign Application Priority Data

May 1, 2012 (KR) .................. 10-2012-0046010

(51) Int. Cl.
  *G09G 5/10* (2006.01)
  *G09G 3/36* (2006.01)
  *G02F 1/1345* (2006.01)
  *G02F 1/1333* (2006.01)
  *G02F 1/1335* (2006.01)

(52) U.S. Cl.
  CPC .......... *G09G 3/3611* (2013.01); *G02F 1/13452* (2013.01); *G02F 1/13454* (2013.01); *G02F 1/133345* (2013.01); *G02F 1/133514* (2013.01); *G02F 2201/52* (2013.01)

(58) Field of Classification Search
  CPC .......... G02F 2201/52; G02F 1/133345; G02F 1/13452; G02F 1/13454; G02F 1/133514; G02F 1/13458; G09G 3/3611
  USPC ............................................................. 349/2
  See application file for complete search history.

(56) References Cited

U.S. PATENT DOCUMENTS

| 2004/0051836 | A1  | 3/2004 | Jung et al. |
| 2006/0044504 | A1* | 3/2006 | Yamada et al. ............. 349/149 |
| 2007/0216614 | A1* | 9/2007 | Nam ............................. 345/77 |
| 2008/0001175 | A1* | 1/2008 | Kim et al. .................. 257/202 |
| 2008/0055212 | A1* | 3/2008 | Kim ............................... 345/80 |
| 2009/0096975 | A1  | 4/2009 | Kwon et al. |

FOREIGN PATENT DOCUMENTS

| CN | 101221959 A | 7/2008 |
| CN | 101625471 A | 1/2010 |
| WO | WO 2007/116568 A1 | 10/2007 |

OTHER PUBLICATIONS

European Patent Office, European Search Report and Opinion, European Patent Application No. 13166178.7, Aug. 16, 2013, twelve pages.
State Intellectual Property Office of the People's Republic of China, First Office Action, Chinese Patent Application No. 201310150364.3, May 5, 2015, fifteen pages.

* cited by examiner

*Primary Examiner* — Charles Hicks
*Assistant Examiner* — Brent D Castiaux
(74) *Attorney, Agent, or Firm* — Fenwick & West LLP

(57) ABSTRACT

Disclosed are a liquid crystal display (LCD) device and a method of fabricating the same, the LCD device having a dual link structure for reducing width of a line diverging section where data link wires diverge to come in contact with data lines. A set of data link wires are placed in a first layer and another set of data link wires are placed in a second layer so that the pitch between the data link wires can be reduced.

17 Claims, 9 Drawing Sheets

LIQUID CRYSTAL DISPLAY DEVICE AND METHOD OF FABRICATING THE SAME

CROSS-REFERENCE TO RELATED APPLICATION

This application claims the benefit of Korean Patent Application No. 10-2012-0046010, filed on May 1, 2012, which is incorporated by reference herein in its entirety. This application is also related to U.S. patent application Ser. No. 13/572,860 filed on Aug. 13, 2012, which claims priority to Korean Patent Application No. 10-2011-0082455 filed on Aug. 18, 2011, and Korean Patent Application No. 10-2011-0123755 filed on Nov. 24, 2011, which are incorporated by reference herein in their entirety.

BACKGROUND OF THE DISCLOSURE

1. Field of the Disclosure

The present disclosure relates to a liquid crystal display (LCD) device and a method of fabricating the same.

2. Discussion of the Related Art

As information technology develops, the market for display devices, a connection medium between a user and information is expanding. As a result, display devices such as a Liquid Crystal Display (LCD) device, an Organic Light Emitting Display (OLED) and a Plasma Display Panel (PDP) are being much used.

Such display devices are being used for various purposes, in the field of home appliances such as televisions or videos, in the field of industrial products such as notebook computers or mobile phones.

Among such display devices, the LCD device serves to display a desired image by individually supplying data signals based on image information, to pixels arranged in the form of matrices, and then by controlling a light transmittance of the pixels.

SUMMARY

Embodiments relate to a liquid crystal display (LCD) device including a substrate with a display area and a driving area. The display area includes a plurality of data lines formed in a first layer of the substrate to extend in a first direction, a plurality of gate lines formed in a second layer of the substrate to extend in a second direction perpendicular to the first direction in the display area, and a thin film transistor (TFT) formed at each intersection of each of the plurality of data lines and each of the plurality of the gate lines. The plurality of the gate lines in conjunction with the plurality of data lines define a plurality of sub-pixels. The driving area surrounds the display area and includes a first set of data link wires and a second set of data link wires. The first set of data link wires is formed in the first layer and placed between a driving circuit and a first subset of the plurality of data lines to carry data signals. The second set of data link wires is formed in the second layer and placed between the driving circuit and a second subset of the plurality of data lines to carry data signals.

In one embodiment, the LCD device further includes an insulating film between the first layer and the second layer.

In one embodiment, connection electrodes connect the second set of the data link wires to the second subset of the plurality of data lines.

In one embodiment, the connection electrodes are formed of a transparent conductive material including indium-tin-oxide or indium-zinc-oxide.

In one embodiment, an $n^{th}$ sub-pixel of a first color is connected to an $n^{th}$ data link wire, a $(n+1)^{th}$ sub-pixel of a second color is connected to a $(n+1)^{th}$ data link wire and a $(n+2)^{th}$ sub-pixel of a third color is connected to a $(n+2)^{th}$ data link wire. The first set of data link wires includes the $n^{th}$ data link wire and the $(n+1)^{th}$ data link wire, and the second set of data link wires includes the $(n+2)^{th}$ data link wire.

In one embodiment, the first color is red, the second color is green, and the third color is blue.

In one embodiment, the first subset of data link wires includes the $n^{th}$ data link wire, and the second subset of data link wires includes $(n+1)^{th}$ data link wire and the $(n+2)^{th}$ data link wire.

In one embodiment, an $n^{th}$ sub-pixel of a first color is connected to a $n^{th}$ data link wire, a $(n+1)^{th}$ sub-pixel of a second color is connected to a $(n+1)^{th}$ data link wire, a $(n+2)^{th}$ sub-pixel of a third color is connected to a $(n+2)^{th}$ data link wire, and a $(n+3)^{th}$ sub-pixel of a fourth color is connected to a $(n+3)^{th}$ data link wire. The first set of data link wires includes the $n^{th}$ data link wire and the $(n+2)^{th}$ data link wire, and the second set of data link wires includes the $(n+1)^{th}$ data link wire and the $(n+3)^{th}$ data link wire.

In one embodiment, the first color is red, the second color is green, the third color is blue and the fourth color is white.

Embodiments also relate to a method of fabricating a liquid crystal display (LCD) device. A set of data link wires is formed in a driving area of a substrate. An insulating film is formed on the substrate formed with the set of data link wires. Another set of data link wires is formed. At least part of the other set of data link is electrically connected to a first set of sub-pixels of a first color via date lines. A passivation film is formed on the substrate formed with the first and second set of data lines. Connection electrodes are formed on the substrate formed with the passivation film for electrically connecting at least part of the set of data link wires to a second set of sub-pixels of a second color via data lines.

In one embodiment, gate electrodes and gate lines are formed in the display area before forming the set of data link wires. An active layer is formed on the insulating film. Source electrodes, drain electrodes, and the data lines defining sub-pixels in conjunction with the gate lines are formed on the active layer in the display area.

In one embodiment, at least part of the set of data link wires is connected to a third set of sub-pixels of a third color via data lines.

In one embodiment, at least part of the other set of data link wires is connected to a third set of sub-pixels of a third color via data lines.

In one embodiment, the set of data link wires is formed in a same layer as gate electrode and gate lines, and the other set of data link wires and the data lines are formed in a same layer as a source electrode and a drain electrode.

Embodiments also relate to a liquid crystal display (LCD) device. The LCD device includes a display area on a substrate and a driving area on the substrate surrounding the display area. The display area includes a plurality of data lines formed in a first layer of the substrate to extend in a first direction, a plurality of gate lines formed in a second layer of the substrate to extend in a second direction perpendicular to the first direction in the display area, the plurality of the gate lines in conjunction with the plurality of data lines defining a plurality of sub-pixels, and a thin film transistor (TFT) formed at each intersection of each of the plurality of data lines and each of the plurality of the gate lines. The driving area includes a plurality sets of data link wires. Each set of data link wires includes a first data link wire configured to carry data signal of a first color, a second data link wire configured to carry data signal of a second color, and a third data link wire configured to carry data signal of a third color. One of the first, second and third link wires formed on one of the first layer or the second layer. Others of the first, second and third link wires formed on the other of the first layer or the second layer.

Further scope of applicability of the present application will become more apparent from the detailed description given hereinafter. However, it should be understood that the detailed description and specific examples, while indicating preferred embodiments, are given by way of illustration only, since various changes and modifications within the spirit and scope of embodiments will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DESCRIPTION OF SPECIFIC EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
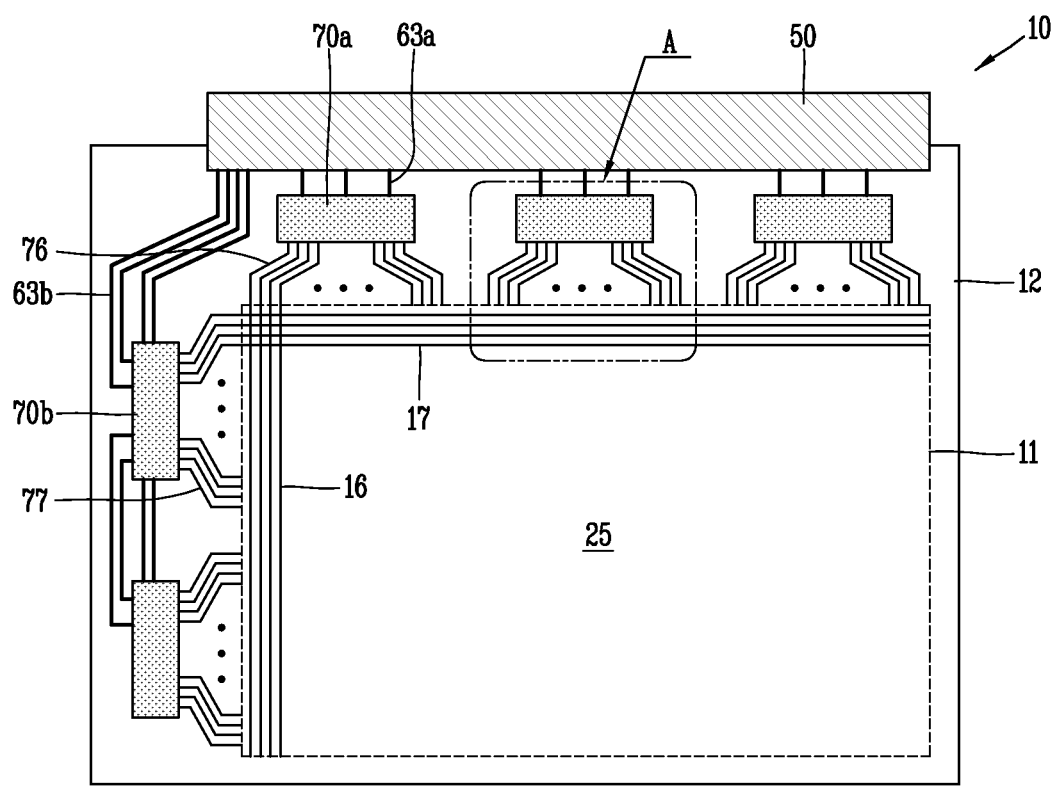
FIG. 1 is a schematic plan view showing an example structure of a liquid crystal display (LCD) device.
Figure 2:
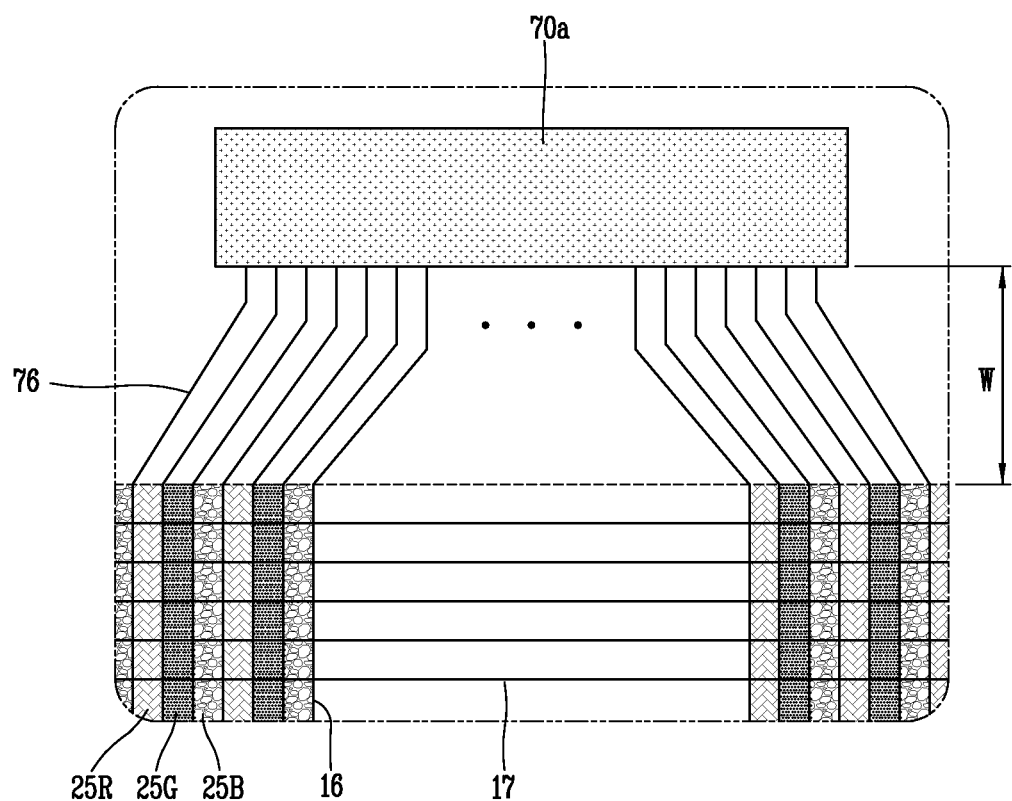
FIG. 2 is an enlarged plan view of a section of the LCD device of FIG. 1.

FIG. 1 is a schematic plan view of an example structure of a liquid crystal display (LCD) device. FIG. 2 is an enlarged plan view of section "A" of the LCD device of FIG. 1 in an enlarged manner. The example structure of liquid crystal display (LCD) device 10 includes an array substrate 12 and a color filter substrate 11 facing each other, and attached to each other with a uniform cell gap. A liquid crystal (LC) layer (not shown) is formed in the cell gap between the array substrate 12 and the color filter substrate 11.

Although not shown in FIG. 1, the color filter substrate 11 includes color filters each consisting of red, green and blue (RGB) sub color filters, black matrices, and an overcoat layer formed above the color filters and the black matrices. The back matrices divide the sub color filters from each other, and shield light which passes through the LC layer.

The array substrate 12 may be divided into a display area 25 and a driving area. In the display area 25, a plurality of sub-pixels 25R, 25G and 25B are arranged in the form of matrices. The driving area surrounds the periphery of the display area 25, and includes driving devices for driving the sub-pixels 25R, 25G and 25B. Data lines 16 and gate lines 17 arranged in vertical and horizontal directions and defining pixel regions are formed in the display area 25 of the array substrate 12. A thin film transistor (TFT, not shown) is formed at each intersection of the data lines 16 and the gate lines 17 (i.e., at a TFT region) as a switching device.

Although not shown, the TFT includes a gate electrode connected to the gate line 17, a source electrode connected to the data line 16, and a drain electrode connected to a pixel electrode. The TFT also includes a gate insulating film for insulating the gate electrode from the source/drain electrodes, and an active layer for forming a conductive channel between the source and drain electrodes by a gate voltage supplied to the gate electrode. The TFT also includes a passivation film for insulating the source/drain electrodes from the pixel electrode.

In the driving area, driving integrated circuits (ICs) 70a and 70b are mounted for applying data signals and gate signals to the data lines 16 and the gate lines 17 extending into the display area 25. When using a Chip On Glass (COG) method to mount the ICs 70a and 70b, the driving ICs 70a and 70b are directly mounted on the array substrate 12.

Data link wires 76 and gate link wires 77 connected to the data lines 16 and the gate lines 17, respectively, are formed in the array substrate 12 of the LCD device 10 formed by such COG method. A data pad (not shown) and a gate pad (not shown) are connected to ends of the data link wires 76 and the gate link wires 77, respectively. The data pad and the gate pad are connected to the data driving IC 70a and the gate driving IC 70b mounted on the array substrate 12, respectively. The data driving IC 70a and the gate driving IC 70b are connected to an external printed circuit board (PCB, not shown) through a flexible printed circuit (FPC) 50. The PCB includes a timing controller and a power supply unit, and has a plurality of devices such as ICs formed thereon. The devices generate various types of control signals, driving voltages, etc. for driving the LCD device.

When using COG method for a simple structure and simplified fabricating processes of the FPC 50, a line on glasses (LOG) method may be used to connect signal lines of the driving ICs 70a and 70b to an external PCB through line via lines 63a and 63b mounted on the array substrate 10. The lines 63a and 63b may be used to carry various control signals, driving voltages, etc. from the external PCB. For convenience, signal lines for connecting FPC pads (not shown) in the FPC 50 with an input bumper (not shown) in the data driving IC 70a, are referred to as Outer Lead Bonding (OLB) wires 63a, and signal lines for connecting the FPC pads with an input bumper (not shown) in the gate driving IC 70b, are referred to as LOG 63b.

The example structure of FIGS. 1 and 2 uses the same number of data link wires 76 as the data lines 16, in order to apply data signals to the data lines 16 connected to a plurality of sub-pixels. In this case, the number of the data link wires 76 increases as the screen size and the resolution of the LCD device 10 increase. The number of the data link wires 76 increases according to the number of the data lines 16, and a width (W) of a line diverging section of the LCD device 10 increases accordingly. Embodiments described herein relate to reducing or alleviating the increase in the width (W) of the line diverging section.

Figure 3:
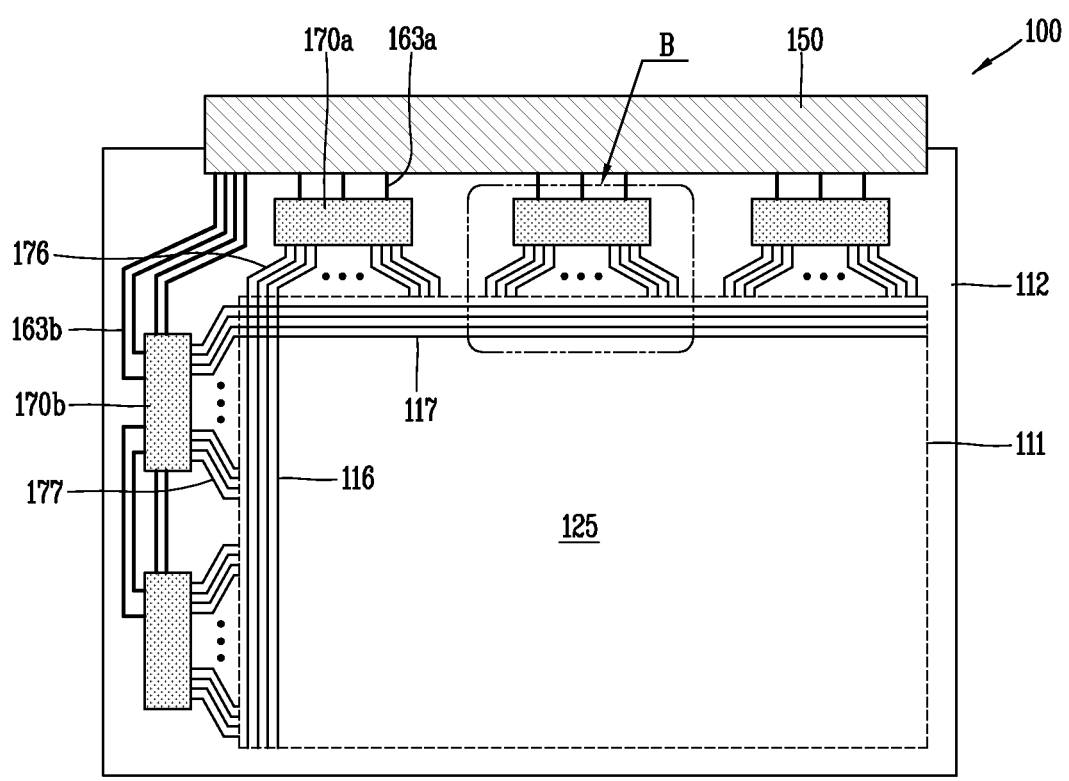
FIG. 3 is a schematic plan view showing a structure of a liquid crystal display (LCD) device according to a first embodiment.
Figure 4:
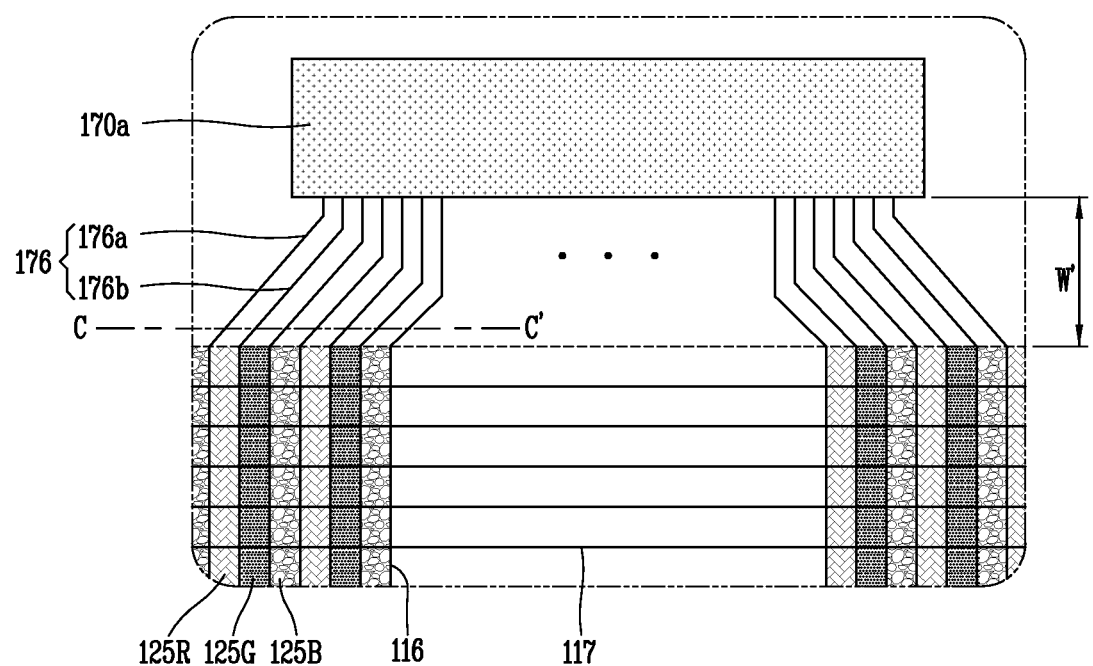
FIG. 4 is an enlarged plan view of the LCD device of FIG. 3 according to the first embodiment.
Figure 5:
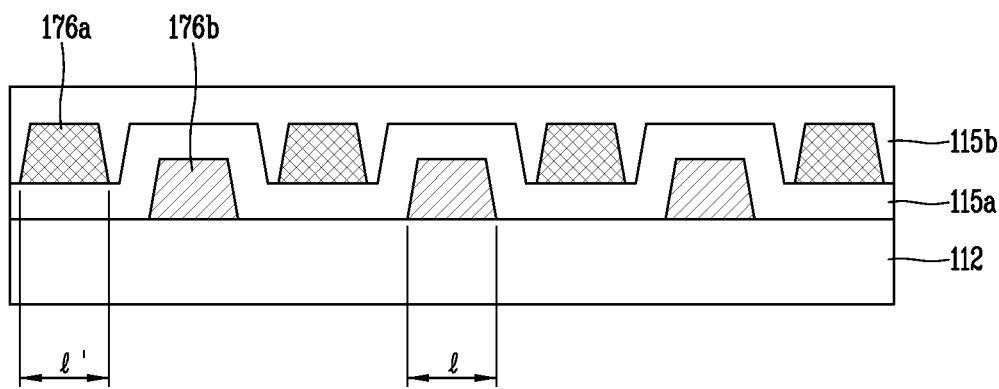
FIG. 5 is a cross-sectional view of a link portion taken along line C-C' of FIG. 4 according to the first embodiment.

FIG. 3 is a schematic plan view of a structure of a liquid crystal display (LCD) device 100 according to a first embodiment. FIG. 4 is an enlarged plan view showing section "B" of the LCD device of FIG. 3 according to the first embodiment. FIG. 5 is a cross-sectional view of a link portion taken along line C-C' of FIG. 4 according to the first embodiment. LCD device 100 includes an array substrate 112 and a color filter substrate 111 functioning in the same way as the array substrate 12 and the color filter substrate 11 of the example structure of FIG. 1. The array substrate 112 may be divided into a display area 125 where a plurality of sub-pixels 125R, 125G and 125B are arranged in the form of matrices, and a driving area surrounding the periphery of the display area 125 and having driving devices for driving the sub-pixels 125R, 125G and 125B.

In the display area 125 of the array substrate 112, data lines 116 and gate lines 117 extend in vertical and horizontal directions to pixel regions in a similar manner as described above with reference to FIG. 1. The TFT includes a gate insulating film 115a for insulating the gate electrode from the source/drain electrodes, and an active layer for forming a conductive channel between the source and drain electrodes by a gate voltage supplied to the gate electrode. The TFT also includes a passivation film 115b for insulating the source/drain electrodes from the pixel electrode.

Driving ICs 170a and 170b are formed in the driving area for applying data signals and gate signals to the data lines 116 and the gate lines 117 inside the display area 125. A method for mounting the driving ICs 170a and 170b on the array substrate 112 may include a Chip On Glass (COG) method, a Tape Carrier Package (TCP) method, a Chip On Film (COF), etc. The COG method bonds the driving ICs 170a and 170b on the array substrate 112 of the LCD device 100, thereby directly connecting an output electrode (not shown) of the driving ICs 170a and 170b, to a wire pad (not shown) of the array substrate 112. The COG method is advantageous, among other reasons, in that the entire process is simplified and the fabricating costs are reduced due to a simple structure. However, other methods may be used to mount the driving ICs 170a and 170b on the array substrate.

Data link wires 176 and gate link wires 177 are connected to the data lines 116 and the gate lines 117, respectively. Data link wires 176 and gate link wires 177 are formed in the driving area of the array substrate 112 of the LCD device formed methods such as COG method. A data pad (not shown) and a gate pad (not shown) are connected to one ends of the data link wires 176 and the gate link wires 177, respectively.

The data pad and the gate pad are respectively connected to the data driving IC 170a and the gate driving IC 170b mounted on the array substrate 112.

The data driving IC 170a and the gate driving IC 170b are connected to an external printed circuit board (PCB, not shown) through an FPC 150, as described above with reference to FIGS. 1 and 2. The gate driving IC 170b receives control signals and driving voltages via FPC 150, and then sequentially applies gate signals to the plurality of gate lines 117. The data driving IC 170a receives control signals, image data and driving voltages via FPC 150 applies data signals corresponding to a single horizontal line to the data lines 116.

Outer Lead Bonding (OLB) wires 163a and LOG 163b are substantially the same as OLB 63a and LOG 63b, described above with reference to FIG. 1.

The LCD device 100 according to the first embodiment is different from the example LCD described above with reference to FIGS. 1 and 2 in that a dual link structure is used. That is, first data link wires 176a and the data lines 116 are formed in one layer, but the second data link wires 176b and the gate lines 117 are formed in another layer. The dual link structure allows the LCD device 100 to have a reduced width (W') of a line diverging section because the pitch between the first and second data link wires 176a and 176b can be reduced compared to the LCD device of FIGS. 1 and 2. Hence, the same number of first and second data link wires 176a and 176b as the LCD device of FIGS. 1 and 2 to be crammed into the line diverging section with a narrower width. Moreover, the first and second data link wires 176a and 176b formed in different layers are not shorted, even if an overlay shift occurs during processes.

Although not shown, under the dual link structure, the LCD device 100 has contact holes and connection electrodes for connecting the second data link wires 176b to the data lines 116 of the display area extending towards the driving area (hereinafter referred to as "link portion data lines"). More specifically, the second data link wire 176b is electrically connected to a connection electrode positioned above the second data link wire 176b via a second contact hole, and the connection electrode is electrically connected to a link portion data line positioned below the second data link wire 176b via a third contact hole.

The connection electrode may be formed of a transparent conductive material such as Indium Tin Oxide (ITO) or Indium Zinc Oxide (IZO). And, the second contact hole and the third contact hole may be formed to expose the surfaces of the second data link wire 176b and the link portion data line, respectively, or to penetrate the second data link wire 176b and the link portion data line, respectively.

However, the first data link wires 176a and the second data link wires 176b are not simultaneously etched in the dual link structure of the LCD device 100. Hence, the first and second data link wires 176a and 176b of sub-pixels of the same color among a plurality of sub-pixels 125R, 125G and 125B (e.g., the red sub-pixel 125R) may have different critical dimensions (CD). For example, the first data link wire 176a has CD (I), and the second data link wire 176b has CD (I') (I≠I'). The CD difference between the respective layers may cause a resistance difference, which may result in a brightness difference and a color difference between the sub-pixels of the same color (125R, 125G, 125B). Such brightness difference and color difference results in a deteriorated picture quality.

For example, the resistance of an $n^{th}$ data line (where n is an integer larger than 0) may be similar to that of an $(n+2)^{th}$ data line, but may be different from that of an $(n+1)^{th}$ data line or an $(n+3)^{th}$ data line. If the $n^{th}$ data line is a data line of a red sub-pixel, the $(n+3)^{th}$ data line is also a data line of a red sub-pixel. Due to different charging characteristics and pixel voltages caused by the resistance difference between the $n^{th}$ data line and the $(n+3)^{th}$ data line, brightness difference may be experienced in pixels associated with the $n^{th}$ data line and the $(n+3)^{th}$ data line. To reduce or remove such brightness difference, it is advantageous to have all the sub-pixels of the same color receive signal via either the first data link wires or the second data link wires, as described below in detail.

Figure 6:
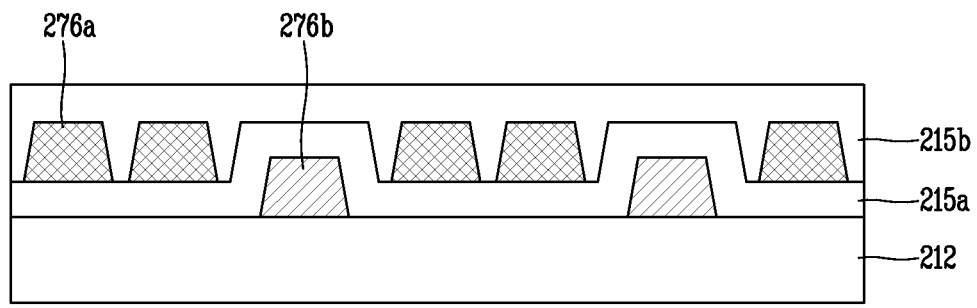
FIG. 6 is a cross-sectional view of a link portion according to a second embodiment.

FIG. 6 is a cross-sectional view of a link portion in an LCD device according to a second embodiment. The LCD device of FIG. 6 has the same structure as the LCD device 100 of FIGS. 3 through 5 except for the arrangement of data link wires. Like the LCD device 100, the LCD device of FIG. 6 has a dual link structure where first data link wires 276a are formed in the same layer as the data lines, and second data link wires 276b are formed in the same layer as the gate lines. As a result, the same number of data link wires 276a and 276b as the example of FIGS. 1 through 3 can be designed in a link portion having a relatively narrower width to reduce the width of the line diverging section and prevent shorting of the first and second data link wires 276a and 276b even if overlay shift occurs during processes.

In the dual link structure of FIG. 6, all the sub-pixels of the same color are connected to either the first data link wires 276a or the second data link wires 276b to attenuate a resistance difference between neighboring data lines. As a result, a non-uniform charging characteristic between the neighboring data lines of the same color can be compensated. This can enhance a picture quality while enabling a narrower line diverging section.

For example, in the second embodiment, in a case where an $n^{th}$ sub-pixel (where n>1), an $(n+1)^{th}$ sub-pixel, and an $(n+2)^{th}$ sub-pixel correspond to red, green and blue (RGB) sub-pixels, respectively, the resistance of an $n^{th}$ data line of the red sub-pixel may not be equal to that of an $(n+2)^{th}$ data line of the red sub-pixel, but may be equal to that of an $(n+3)^{th}$ data line of the red sub-pixel. Since there is no substantial resistance difference between the $n^{th}$ data line and the $(n+3)^{th}$ data line, between the $(n+1)^{th}$ data line and the $(n+4)^{th}$ data line, and between the $(n+2)^{th}$ data line and the $(n+5)^{th}$ data line of the same color, the same charging characteristic and the same pixel voltage are implemented therebetween. This may reduce or remove difference in brightness.

In the second embodiment, an $n^{th}$ data link wire of the red sub-pixel and a $(n+1)^{th}$ data link wire of the green sub-pixel, are configured as the first data link wires 276a. And, an $(n+2)^{th}$ data link wire of the blue sub-pixel is configured as the second data link wire 276b. Such assignment of sub-pixels to data link wires is merely illustrative and different arrangements may also be used. For example, the $n^{th}$ data link wire of the red sub-pixel may be configured as the first data link wire 276a, and the $(n+1)^{th}$ data link wire of the green sub-pixel and the $(n+2)^{th}$ data link wire of the blue sub-pixel may configured as the second data link wires 276b, as described below with reference to FIG. 7.

Figure 7:
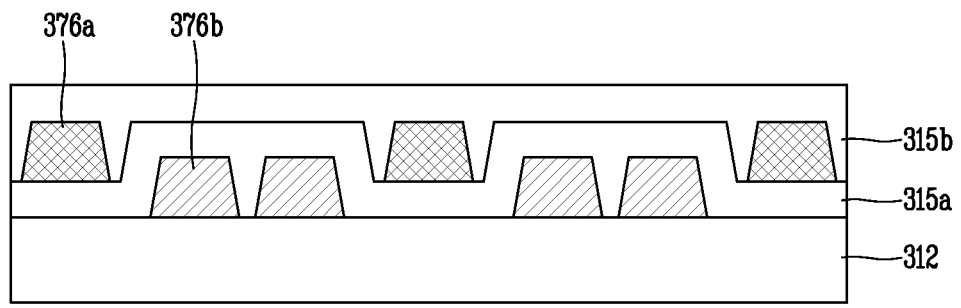
FIG. 7 is a cross-sectional view of a link portion according to a third embodiment.

FIG. 7 is a cross-sectional view of a link portion in an LCD device according to a third embodiment. The LCD device of FIG. 7 has the same structure as the LCD devices according to first and second embodiments, except for a structure of data link wires. Like the LCD devices according to first and second embodiments, the LCD device according to a third embodiment has a dual link structure where first data link wires 376a are formed in the same layer as the data lines, and second data link wires 376b are formed in the same layer as the gate lines. The embodiment of FIG. 7 is different from the second embodiment of FIG. 6 in that an $n^{th}$ data link wire of the red sub-pixel is configured as the first data link wire 376. And, an $(n+1)^{th}$ data link wire of the green sub-pixel, and an $(n+2)^{th}$ data link wire of the blue sub-pixel are configured as the second data link wires 376b.

Figure 9:
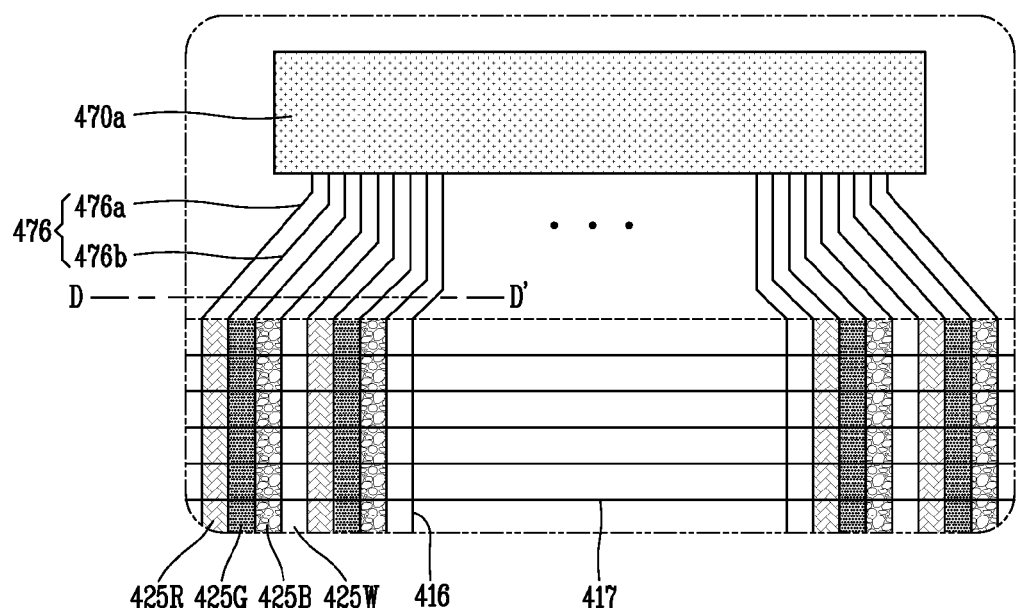
FIG. 9 is an enlarged plane view of an LCD device according to a fourth embodiment.
Figure 10:
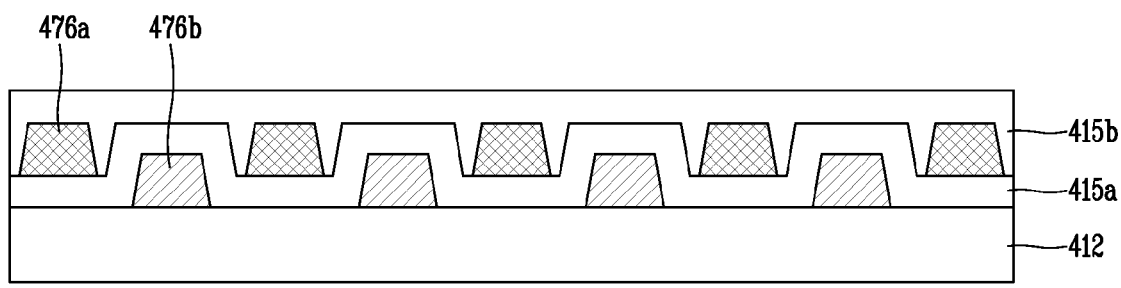
FIG. 10 is a cross-sectional view of a link portion according to a fourth embodiment.

In the first to third embodiments, three sub-pixels (red, green and blue) constitute a single pixel. However, other embodiments may use four sub-pixels (red, green, blue and white) to constitute a single pixel to enhance brightness. This will be explained in more detail with an LCD device according to a fourth embodiment with reference to FIGS. 9 and 10. FIG. 9 is an enlarged plan view of an LCD device according to the fourth embodiment. FIG. 10 is a cross-sectional view taken along line D-D' of FIG. 9.

The liquid crystal display (LCD) device of FIG. 9 comprises an array substrate 412 and a color filter substrate (not shown) facing each other with a uniform cell gap, and an LC layer (not shown) formed in the cell gap between the array substrate 412 and the color filter substrate. Although not shown, the color filter substrate includes color filters each consisting of red, green, blue and white sub color filters, black matrices and an overcoat layer formed above the color filters and the black matrices. The black matrices divide the sub color filters from each other, and shield light which passes through the LC layer. The array substrate 412 may be divided into a display area 425 where a plurality of sub-pixels 425R, 425G, 425B and 425W are arranged in the form of matrices, and a driving area allocated at the periphery of the display area 425 and having driving devices for driving the sub-pixels 425R, 425G, 425B and 425W. Data lines 416 and gate lines 417 arranged in vertical and horizontal directions and defining pixel regions are formed in the display area 425 of the array substrate 412.

The TFT includes a gate insulating film 415a for insulating the gate electrode from the source/drain electrodes, and an active layer for forming a conductive channel between the source and drain electrodes by a gate voltage supplied to the gate electrode. The TFT also includes a passivation film 415b for insulating the source/drain electrodes from the pixel electrode.

In the driving area, data driving IC 470a and a gate driving IC (not shown) for applying data signals and gate signals to the data lines 416 and the gate lines 417 are formed in the display area 425. Data link wires 476 and gate link wires (not shown) connected to the data lines 416 and the gate lines 417, respectively, are formed in the driving area of the array substrate 412 of the LCD device.

Like the LCD devices according to first to third embodiments, the LCD device of FIGS. 9 and 10 also has a dual link structure where first data link wires 476a and the data lines 416 are formed in one layer, and second data link wires 476b and the gate lines 417a re formed in another layer. In the dual link structure according to a fourth embodiment, all the sub-pixels of the same color are configured as the first data link wires 476a or the second data link wires 476b.

In the fourth embodiment, an $n^{th}$ data link wire of the red sub-pixel and a $(n+2)^{th}$ data link wire of the blue sub-pixel are configured as the first data link wires 476a. And, a $(n+1)^{th}$ data link wire of the green sub-pixel and a $(n+3)^{th}$ data link wire of the white sub-pixel, are configured as the second data link wires 476b. However, such arrangement is merely illustrative. That is, in other embodiments, the $n^{th}$ data link wire of the red sub-pixel and the $(n+2)^{th}$ data link wire of the blue sub-pixel are configured as the second data link wires 476b, and the $(n+1)^{th}$ data link wire of the green sub-pixel and the $(n+3)^{th}$ data link wire of the white sub-pixel are configured as the first data link wires 476a.

In the first to fourth embodiments, the array substrate may be bonded to the color filter substrate by a sealant formed at the outer periphery of an image display region. Thin film transistors, black matrices for preventing light leakage to gate lines and data lines, and color filters for implementation of red, green and blue colors (and white colors) are formed on the color filter substrate.

In one embodiment, the color filter substrate and the array substrate are bonded to each other by a bonding key formed on the color filter substrate or the array substrate.

Hereinafter, a method of fabricating such LCD device will be explained in more detail with reference to the attached drawings. FIGS. 8A through 8E are cross-sectional views showing processes for fabricating an LCD device according to the second embodiment described above with reference to FIG. 6.

Figure 8A:
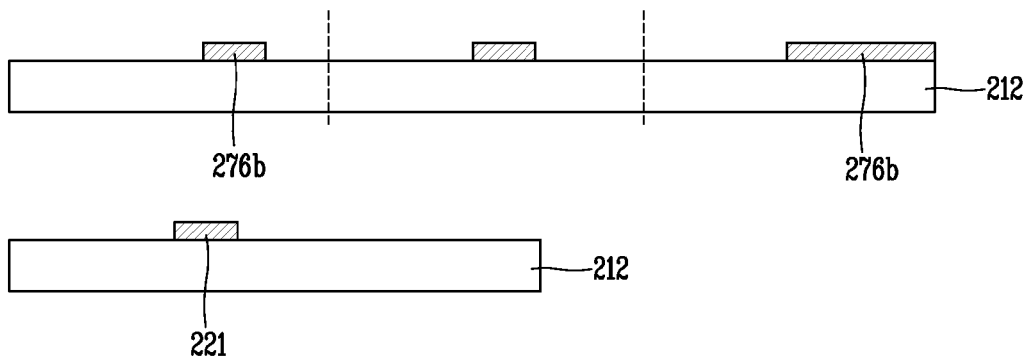
FIGS. 8A through 8F are cross-sectional views showing processes for fabricating an LCD device according to the second embodiment.

As shown in FIG. 8A, a gate electrode 221 and a gate line (not shown) are formed in a display area of an array substrate 212 formed of a transparent insulating material such as glass. And, second data link wires 276b are formed in a driving area of the array substrate 212.

The gate electrode 221, the gate lines and the second data link wires are formed by applying a first conductive film onto the entire surface of the array substrate 212, and then by selectively patterning the first conductive film through a photolithography (first mask process).

The first conductive film may be formed of a low resistance opaque conductive material such as aluminum (Al), Al alloy, tungsten (W), copper (Cu), chromium (Cr), molybdenum (Mo) and Mo alloy. The first conductive material may be formed to have a multi-layered structure where at least two of the above materials are laminated onto each other.

Figure 8B:
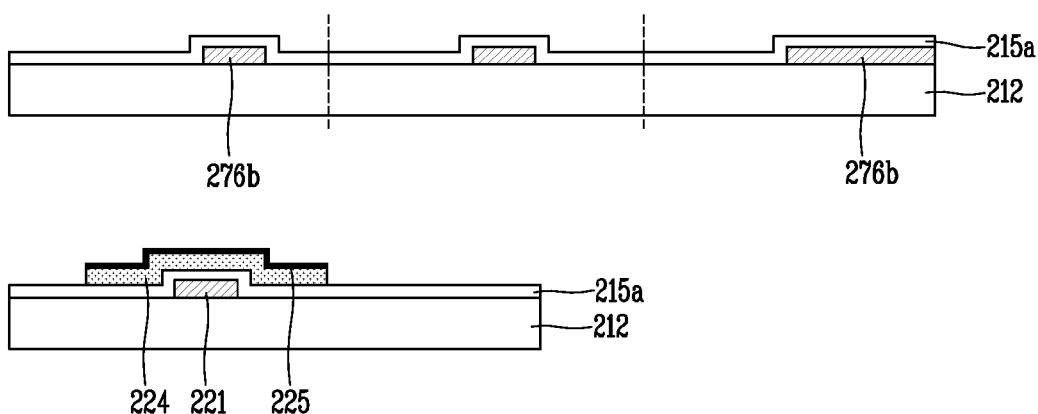

Then, as shown in FIG. 8B, a gate insulating film 215a, an amorphous silicon thin film, and an n+ amorphous silicon thin film are formed on the entire surface of the array substrate 212 where the gate electrode 221, the gate lines and the second data link wires have been formed.

Then, the amorphous silicon thin film and the n+ amorphous silicon thin film are selectively removed by a photolithography process (second mask process), thereby forming an active layer 224 formed of the amorphous silicon thin film, on a TFT region of the array substrate 212.

An n+ amorphous silicon thin film pattern 225 patterned in the same shape as the active layer 224, is formed on the active layer 224.

Figure 8C:
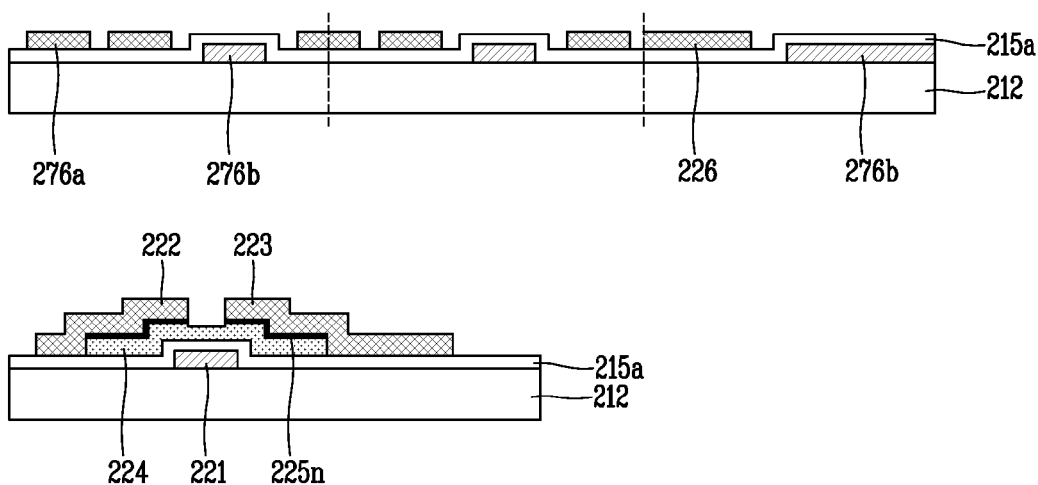

Then, as shown in FIG. 8C, a second conductive film is formed on the entire surface of the array substrate 212 where the active layer 224 and the n+ amorphous silicon thin film pattern 225 have been formed. The second conductive film may be formed of a low resistance opaque conductive material such as aluminum (Al), Al alloy, tungsten (W), copper (Cu), chromium (Cr), molybdenum (Mo) and Mo alloy. The second first conductive material may be formed to have a multi-layered structure where at least two of the above materials are laminated onto each other.

Then, the n+ amorphous silicon thin film and the second conductive film are selectively removed through a photolithography process (third mask process), thereby forming, on the active layer 224, a source electrode 222 and a drain electrode 223 formed of the second conductive film.

While data lines (not shown) formed of the second conductive film are formed in a data line area of the array substrate 212 through the third mask process, the first data link wires 276a formed of the second conductive film and link portion data lines 226 extending from the data lines are formed in a driving area of the array substrate 212.

All the sub-pixels of the same color are connected the first data link wires 276a or the second data link wires 276b. In this case, an $n^{th}$ (where n is an integer larger than 0) data link wire of a red sub-pixel and an $(n+1)^{th}$ data link wire of a green sub-pixel, are configured as the first data link wires 276a. And, an $(n+2)^{th}$ data link wire of a blue sub-pixel is configured as the second data link wires 276b.

On the active layer 224, an ohmic-contact layer 225n of the n+ amorphous silicon thin film is formed to provide ohmic-contact between source/drain regions of the active layer 224 and the source/drain electrodes 222, 223.

Although the fabrication method was described above with reference to individually forming the active layer 224, the source electrode 222, the drain electrode 223, the data lines and the first data link wires 276a through two mask processes. However, such fabrication method is merely illustrative. That is, the active layer 224, the source electrode 222, the drain electrode 223, the data lines and the first data link wires 276a may be formed through a single mask process, by a diffraction exposure or a half tone exposure.

Figure 8D:
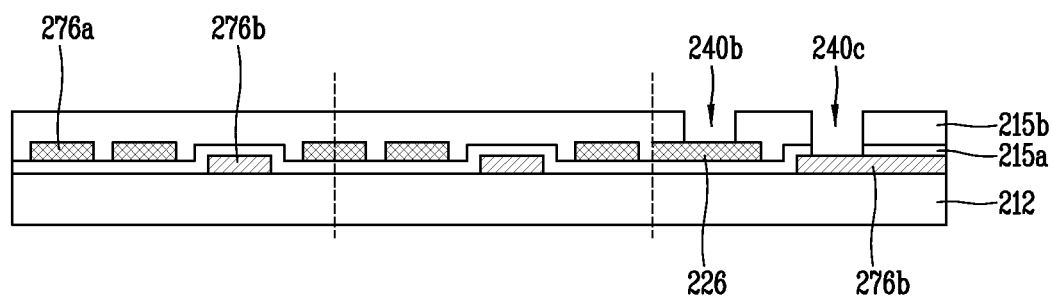
Figure 8D:
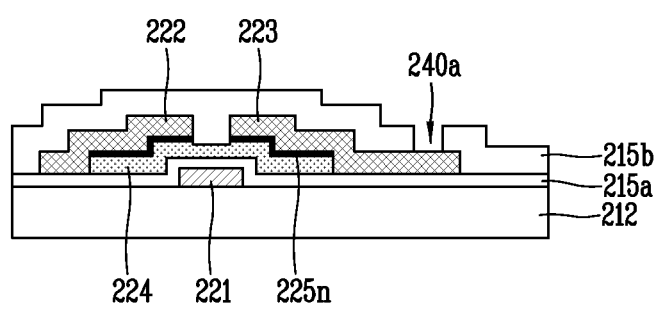

As shown in FIG. 8D, a passivation film 215b is formed on the entire surface of the array substrate 212 where the source electrode 222, the drain electrode 223, the data lines and the first data link wires 276a have been formed.

Then, the passivation film 215b and the gate insulating film 215a are selectively removed through a photolithography process (fourth mask process), thereby forming a first contact hole 240a in the display area of the array substrate 212, and forming a second contact hole 240b and a third contact hole 240c in the driving area of the array substrate 212. Here, the first contact hole 240a serves to expose part of the drain electrode 223, and the second contact hole 240b and the third contact hole 240c serve to expose one ends of the link portion data lines 226 and the second data link wires 276b, respectively.

Here, the second contact hole 240b and the third contact hole 240c may be formed to expose the link portion data lines 226 and the second data link wires 276b positioned below the link portion data lines 226 and the second data link wires 276b. Alternatively, the second contact hole 240b and the third contact hole 240c may be formed to penetrate the link portion data lines 226 and the second data link wires 276b.

Figure 8E:
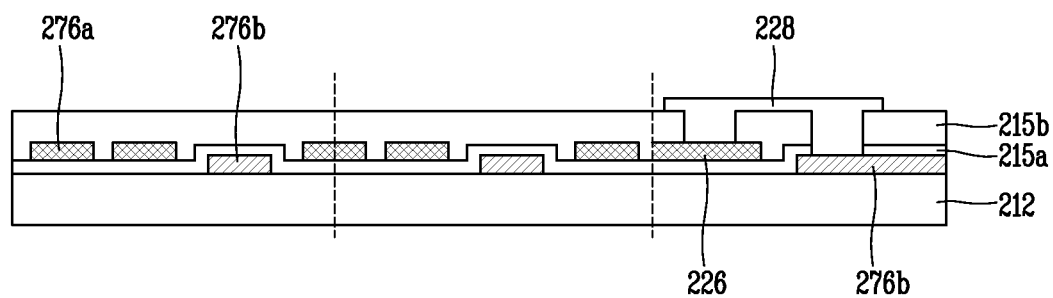
Figure 8E:
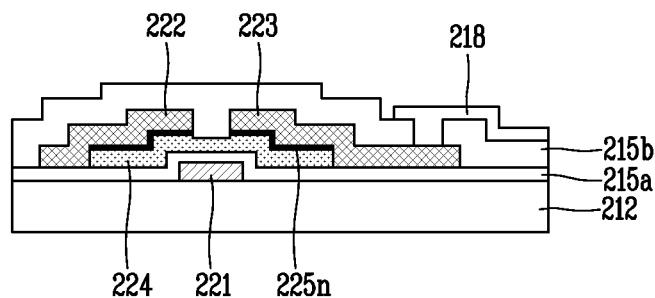

As shown in FIG. 8E, a third conductive film of a transparent conductive material is formed on the entire surface of the array substrate 212 where the passivation film 215b has been formed. Then, the third conductive film is selectively patterned through a photolithography process (fifth mask process), thereby forming, in the display area of the array substrate 212, a pixel electrode 218 electrically connected to the drain electrode 223 via the first contact hole 240a.

Figure 8F:
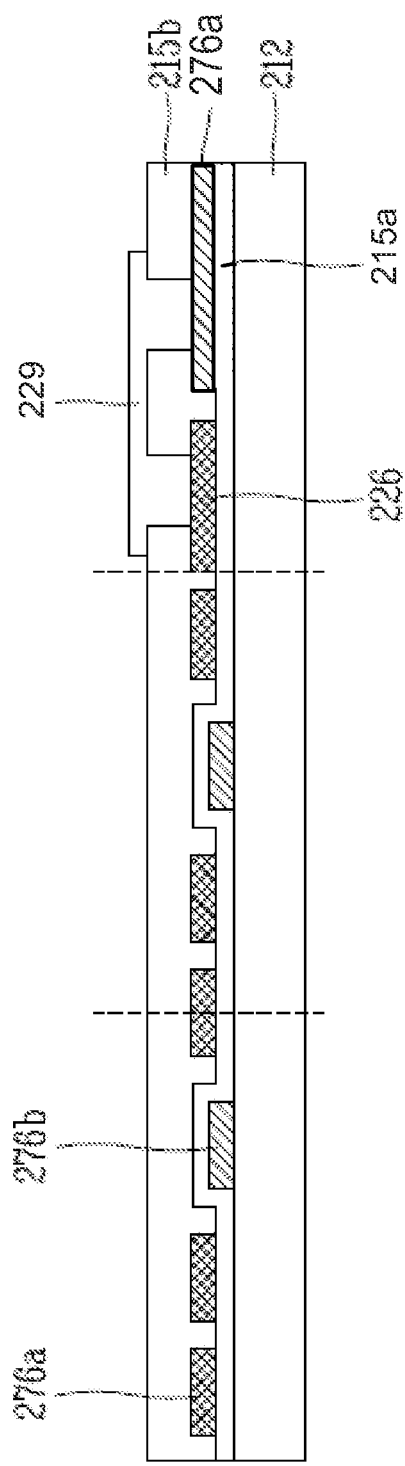

FIG. 8F is a diagram illustrating first data link wire 276a connected to link portion data line 226 via connection electrode 229. Although first data link wire 276a and the link portion data line 226 is placed on the same level, the connection between first data link wire 276a and the link portion data line 226 is achieved via connection electrode 229 to add resistance between the link wire 276a and the link portion data line 226. In this way, the overall resistance of the signal path from data line 226 to the first data link wire 276a can be increased to the same or similar level as the overall resistance of the signal path from data line 226 and second data link wires 276b as shown in FIG. 8E.

As the third conductive film is selectively patterned through a photolithography process (fifth mask process), connection electrodes 228 are formed to electrically connected to the link portion data lines 226 and the second data link wires 276b via the second contact hole 240b and the third contact hole 240c. Based on such configuration, the second data link wires 276b are electrically connected to the link portion data lines 226 via the connection electrodes 228.

Although embodiments are described herein primarily with reference to an LCD device, the same principle is applicable to other types of display device manufactured using a thin film transistor (e.g., an OLED display device).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A liquid crystal display (LCD) device, comprising:
a display area on a substrate, comprising:
a plurality of data lines in a first layer of the substrate to extend in a first direction,
a plurality of gate lines in a second layer of the substrate to extend in a second direction perpendicular to the first direction in the display area, the plurality of the gate lines in conjunction with the plurality of data lines defining a plurality of sub-pixels, and
a thin film transistor (TFT) at each intersection of each of the plurality of data lines and each of the plurality of the gate lines; and
a driving area on the substrate and surrounding the display area, the driving area comprising:
a first set of data link wires in the first layer and placed between a driving circuit and a first subset of the plurality of data lines to carry data signals; and
a second set of data link wires in the second layer and placed between the driving circuit and a second subset of the plurality of data lines to carry data signals;
wherein sub-pixels of a first color are connected to the first set of data link wires, sub-pixels of a second color are connected to the second set of data link wires, and sub-pixels of a third color are connected to the first or second set of data link wires.

2. The LCD device of claim 1, further comprising an insulating film between the first layer and the second layer.

3. The LCD device of claim 2, further comprising:
first connection electrodes configured to electrically connect the second set of the data link wires to the second subset of the plurality of data lines; and
second connection electrodes configured to electrically connect the first set of the data link wires to the first subset of the plurality of data lines.

4. The LCD device of claim 3, wherein the connection electrodes are of a transparent conductive material including indium-tin-oxide or indium-zinc-oxide.

5. The LCD device of claim 1, wherein an $n^{th}$ sub-pixel of the first color is connected to a $n^{th}$ data link wire, $(n+1)^{th}$ sub-pixel of the third color is connected to a $(n+1)^{th}$ data link wire and $(n+2)^{th}$ sub-pixel of the second color is connected to a $(n+2)^{th}$ data link wire, wherein the first set of data link wires comprises the $n^{th}$ data link wire and $(n+1)^{th}$ data link wire, and the second set of data link wires comprises the $(n+2)^{th}$ data link wire.

6. The LCD device of claim 5, wherein the first color is red, the second color is blue, and the third color is green.

7. The LCD device of claim 1, wherein an $n^{th}$ sub-pixel is connected to an $n^{th}$ data link wire, a $(n+1)^{th}$ sub-pixel is connected to a $(n+1)^{th}$ data link wire and a $(n+2)^{th}$ sub-pixel is connected to a $(n+2)^{th}$ data link wire, wherein the first set of data link wires comprises the $n^{th}$ data link wire, and the second set of data link wires comprises the $(n+1)^{th}$ data link wire and the $(n+2)^{th}$ data link wire.

8. The LCD device of claim 1, wherein an $n^{th}$ sub-pixel of the first color is connected to an $n^{th}$ data link wire, a $(n+1)^{th}$ sub-pixel of the second color is connected to a $(n+1)^{th}$ data link wire, $(n+2)^{th}$ sub-pixel of the third color is connected to a $(n+2)^{th}$ data link wire, and a $(n+3)^{th}$ sub-pixel of a fourth color is connected to a $(n+3)^{th}$ data link wire, wherein the first set of data link wires comprises the $n^{th}$ data link wire and the $(n+2)^{th}$ data link wire, and the second set of data link wires comprises the $(n+1)^{th}$ data link wire and the $(n+3)^{th}$ data link wire.

9. The LCD device of claim 8, wherein the first color is red, the second color is green, the third color is blue and the fourth color is white.

10. A method of fabricating a liquid crystal display (LCD) device, comprising:
forming a set of data link wires in a driving area of a substrate;
forming an insulating film on the substrate formed with the set of data link wires;
forming another set of data link wires on the substrate formed with the insulating layer, at least part of the other set of data link wires electrically connected to a first set of sub-pixels of a first color in a display area of the substrate via data lines;
forming a passivation film on the substrate formed with the first and second set of data lines;
forming connection electrodes on the substrate formed with the passivation film for electrically connecting at least part of the set of data link wires to a second set of sub-pixels of a second color via data lines; and
forming connection electrodes on the substrate formed with the passivation film for electrically connecting at least part of the set or the other set of data link wires to a third set of sub-pixels of a third color via data lines;
wherein the set of data link wires is formed in a same layer as gate electrode and gate lines, and the other set of data link wires and the data lines are formed in a same layer as a source electrode and a drain electrode.

11. The method of claim 10, further comprising:
forming gate electrodes and gate lines in the display area before forming the set of data link wires;
forming an active layer on the insulating film; and
forming source electrodes, drain electrodes, and the data lines defining sub-pixels in conjunction with the gate lines, on the active layer in the display area.

12. The method of claim 10, wherein an $n^{th}$ sub-pixel of the first color is connected to an $n^{th}$ data link wire, a $(n+1)^{th}$ sub-pixel of the third color is connected to a $(n+1)^{th}$ data link wire and a $(n+2)^{th}$ sub-pixel of the second color is connected to a $(n+2)^{th}$ data link wire, wherein the set of data link wires comprises the $n^{th}$ data link wire and the $(n+1)^{th}$ data link wire, and the other set of data link wires comprises the $(n+2)^{th}$ data link wire.

13. The method of claim 12, wherein the first color is red, the second color is blue, and the third color is green.

14. The method of claim 10, wherein an $n^{th}$ sub-pixel is connected to an $n^{th}$ data link wire, $(n+1)^{th}$ sub-pixel is connected to a $(n+1)^{th}$ data link wire and $(n+2)^{th}$ sub-pixel is connected to a $(n+2)^{th}$ data link wire, wherein the set of data link wires comprises the $n^{th}$ data link wire, and the second set of data link wires comprises the $(n+1)^{th}$ data link wire and the $(n+2)^{th}$ data link wire.

15. The method of claim 10, wherein an $n^{th}$ sub-pixel of the first color is connected to an $n^{th}$ data link wire, a $(n+1)^{th}$ sub-pixel of the second color is connected to a $(n+1)^{th}$ data link wire, $(n+2)^{th}$ sub-pixel of the third color is connected to a $(n+2)^{th}$ data link wire, and $(n+3)^{th}$ sub-pixel of a fourth color is connected to a $(n+3)^{th}$ data link wire, wherein the set of data link wires comprises the $n^{th}$ data link wire and the $(n+2)^{th}$ data link wire, and the other set of data link wires comprises the $(n+1)^{th}$ data link wire and the $(n+3)^{th}$ data link wire.

16. The method of claim 15, wherein the first color is red, the second color is green, the third color is blue and the fourth color is white.

17. A liquid crystal display (LCD) device, comprising:
a display area on a substrate, comprising:
- a plurality of data lines in a first layer of the substrate to extend in a first direction,
- a plurality of gate lines in a second layer of the substrate to extend in a second direction perpendicular to the first direction in the display area, the plurality of the gate lines in conjunction with the plurality of data lines defining a plurality of sub-pixels, and
- a thin film transistor (TFT) at each intersection of each of the plurality of data lines and each of the plurality of the gate lines; and a driving area on the substrate and surrounding the display area, the driving area comprising a plurality sets of data link wires, each set of data link wires comprising:
- a first set of data link wires formed in the first layer and placed between a driving circuit and a first subset of the plurality of data lines to carry data signals; and
- a second set of data link wires formed in the second layer and placed between the driving circuit and a second subset of the plurality of data lines to carry data signals;
- wherein sub-pixels of a first color are connected to the first set of data link wires, sub-pixels of a second color are connected to a second set of data link wires, and sub-pixels of a third color are connected to either the first or second set of data link wires.

* * * * *